April 2, 1940.  H. G. FERGUSON  2,195,515
GROUND ENGAGING MEANS FOR AGRICULTURAL IMPLEMENTS
Filed Jan. 22, 1937  2 Sheets-Sheet 2

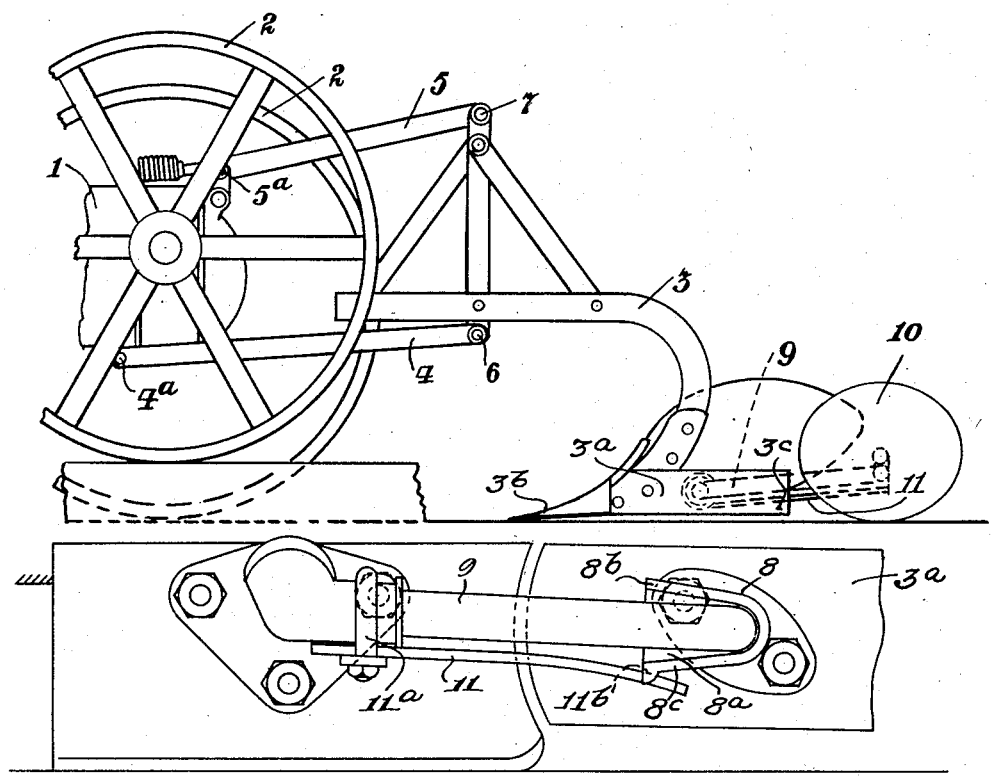
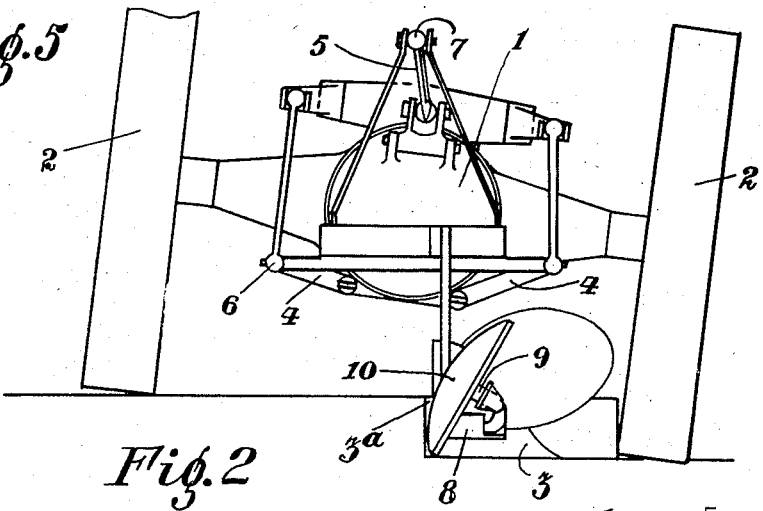

Henry George Ferguson
INVENTOR

Patented Apr. 2, 1940

2,195,515

UNITED STATES PATENT OFFICE 2,195,515

GROUND ENGAGING MEANS FOR AGRICULTURAL IMPLEMENTS

Henry George Ferguson, Belfast, Northern Ireland

Application January 22, 1937, Serial No. 121,730
In Great Britain February 5, 1936

20 Claims. (Cl. 97—47)

This invention relates to agricultural implements for use with tractors, its object being to provide improvements therein.

The invention relates especially to agricultural implements adapted to be attached to the tractor by upper and lower links, as disclosed, for example, in my prior Patents Nos. 1,464,130 and 1,916,945, which cause the implement, when it moves up and down, to execute a more or less parallel motion. With an ordinary single point connection an implement, such as a plough, drops into the ground on its point and thus quickly reaches its working depth. With an upper and lower link connection, however, the plough drops to the ground in a substantially horizontal position and there is therefore not the same tendency for the plough to get down quickly to its working depth. It is therefore necessary to shape the bottom of the landside of the plough, so that the point of the plough will have a certain amount of vertical lead into the land. This shaping, however, reduces or eliminates the lateral and vertical support which the normal landside gives and it is necessary to provide means which will compensate for this lack of support.

The invention is also especially applicable to implements operated for depth regulation as described in my prior Patent No. 1,687,719 and pending patent applications Nos. 122,609 and 122,610 filed on 27th January, 1937.

A further object is to provide means for adjusting the position of the ground-engaging member vertically and/or laterally in relation to the implement.

Other objects will appear from the following description and appended claims.

In the accompanying drawings the invention is shown, by way of example, applied to a plough, attached to a tractor by means such as described in my prior patent specification No. 1,916,945.

Fig. 1 is an elevation of the rear end of a tractor showing the tractor wheels and a plough attached to the tractor and in working position.

Fig. 2 is a rear end elevation corresponding to Fig. 1.

Fig. 5 is a view in side elevation and Fig. 6 an end view of the skid used in place of the disk.

Figure 3:
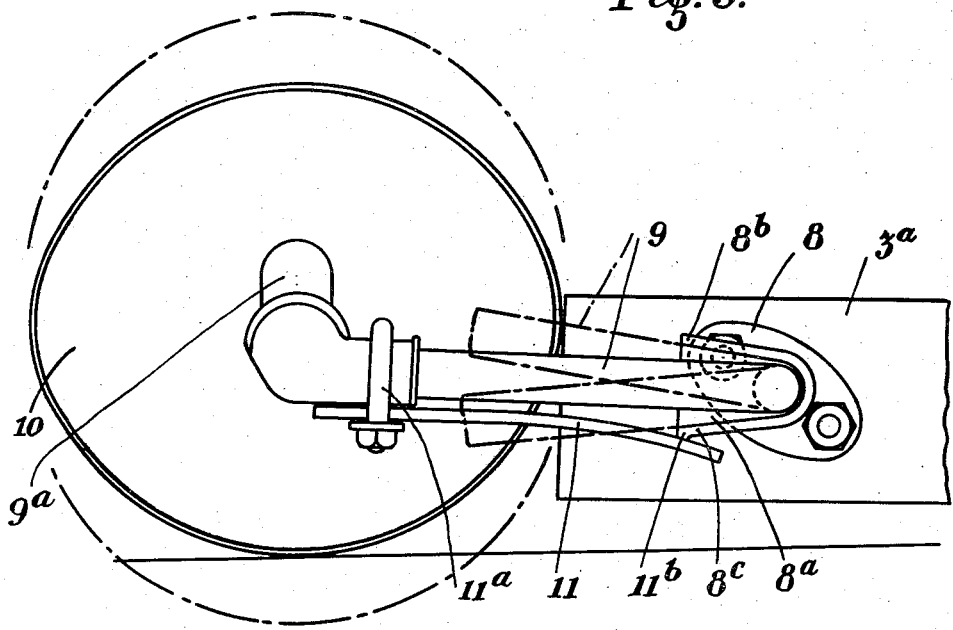
Fig. 3 is an enlarged detail view of the reverse side of the ground-engaging member to that shown in Fig. 1, and shows details of its connection with the plough.

Referring to the drawings:

1 is the rear end of the tractor and 2 the tractor wheels. The plough 3 is attached to the tractor through the links 4 and 5, one end of the links 4 being universally connected by a ball and socket (indicated diagrammatically) at 6 to the plough frame, and at the ends 4a universally connected in similar manner to the rear of the tractor. The link 5 is universally connected by a ball and socket (indicated diagrammatically) at 7 to the plough frame, its other end 5a being universally connected in similar manner to the tractor. This arrangement of links provides, as described in my prior patent specification No. 1,916,945, for vertical and lateral freedom of movement of the implement relatively to the tractor and causes the vertical movement of the implement to be substantially parallel.

Attached to the landside 3a of the plough is a bracket 8 which provides a pivotal support for an arm 9 on which the ground-engaging member 10 is carried, and permits of limited vertical movement of the arm 9 within the sector 8a, the upper and lower flanges 8b and 8c of which form upper and lower stoppers to limit vertical swinging movement of the arm 9 as indicated in dotted lines in Fig. 3. Lateral rigidity is provided by the bracket 8, which is rigidly bolted to the landside 3a of the plough. The lower flange or stopper 8c prevents the ground-engaging member 10 from dropping too far when the implement is raised on the tractor.

Figure 4:
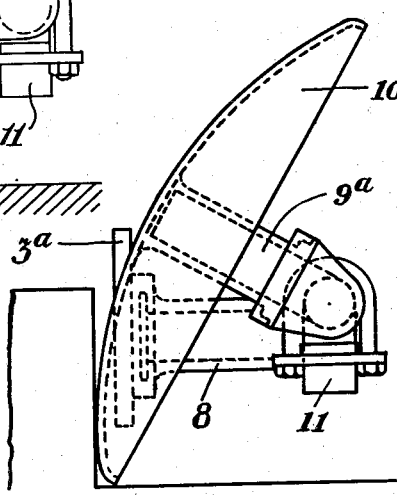
Fig. 4 is an enlarged end view corresponding to Fig. 3 and shows the ground-engaging member viewed as in Fig. 2.

The ground-engaging member 10, in the example shown, consists of a saucer-shaped disc or wheel, and it will be noted from Figs. 2 and 4 that the arm 9, 9a is attached to the bracket 8 to give the wheel 10 a predetermined angle of contact with the ground and to facilitate contact of the lower part of the convex side with the furrow wall without preventing free turning of the member 10. The ground-engaging wheel or disc 10 is, in the example shown, kept in contact with the ground by its own weight assisted by the action of a leaf spring 11 attached to the arm 9 at 11a and bearing on the bottom of the bracket 8 at 11b. The upper flange or stopper 8b is provided in this example to prevent overstressing the leaf spring 11 when the wheel is subjected to abnormal movements.

The wheel or disk 10 may be replaced by a skid pivotally supported at 9a.

When an implement is attached to the tractor by means as described in my prior Patent No. 1,464,130 or 1,916,945, such means being shown in Fig. 1 of the present drawings, the implement (in this case the plough 3) drops to the ground in a substantially horizontal position. In normal practice the bottom edge of the landside 3a rests upon the ground and this gives the implement the necessary support vertically and horizontally but, where an implement is carried on the tractor, in the manner hereinbefore described the bottom edge of the landside 3a must be so shaped that the share point 3b will have a certain amount of vertical lead into the land with the rear end 3c entering later. This enables the plough to enter quickly to the required depth but reduces or eliminates the lateral and vertical support which the normal landside gives. To compensate for the absence of this support the ground-engaging wheel or member 10, while allowing the implement to get down to its depth quickly, also provides the necessary support on the ground and also laterally from the furrow-wall. Thus, the member 10 prevents the plough from swinging away from its work and also allows it to keep at a regular depth over uneven ground. It will be clear that the implement (in this case the plough 3) is free to follow the contour of the ground, being permitted to do so by the linkage connection with the tractor and the vertical freedom of movement permitted by the fact that the ground-engaging member 10 is turnably connected with the plough landside and so is permitted free vertical movement whilst, at the same time, as stated, providing the necessary lateral support against the furrow wall.

It will be noted that the axis of the pivotal support on the bracket 8 for the arm 9 is lower than the centre of the wheel 10 when the wheel is in normal working position as shown, with the result that the arm 9, which transmits the draft to the wheel, slopes upwardly to the rear. Thus the wheel is subjected to a line of draft or pull which gives rise to a downward pressure tending to keep it in the ground and prevent it from climbing the furrow wall and lifting the implement out of the ground. This line of draft therefore permits the use of a weak assisting spring 11 for keeping the wheel 10 on the ground, it being advantageous to have as weak a spring as possible in order to have the minimum resistance or interference with the action of the depth-control means as hereinafter described. The line of draft and the spring means are so arranged that, in normal working position, the wheel (see Fig. 3) has a "floating" connection with the implement and is capable of upwards or downwards relative movement, the amplitude of which is determined by the stop means.

Figure 6:
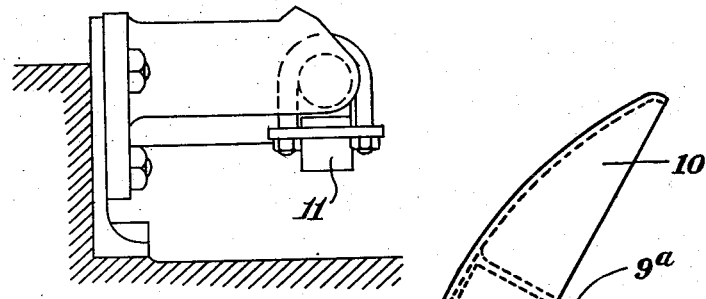

As will be seen from Fig. 2, the lower laterally spaced links 4 are universally connected at their ends to the plough frame 3 and to the tractor. These links converge towards the front and their axes, if produced, meet at a point, at or about, the front axle of the tractor. As a result of this arrangement of linkage the plough and tractor function as if the plough were attached at said point, and consequently, should the tractor be turned to the left or the right, the plough is immediately turned in the same direction as described in my prior Patent No. 1,916,945. For the proper functioning of this arrangement it is necessary for the plough to be capable of swinging laterally with reference to the tractor and hence the usual land wheels have to be dispensed with. This deprives the plough of guiding means and it is therefore necessary to provide, in combination with the links 4, the ground-engaging member or part as above described, to keep the plough normally in the true path behind the tractor. The disc 10 in the furrow provides this directional effect by bearing against the edge of the furrow, as clearly shown in Figure 4 or Figure 6. The furrow may be so shallow in some cases for very shallow ploughing that the landside (3a) which is shown cut away, would not keep the implement following in a straight line. The disc however, which is movable vertically with reference to the plough, runs on the furrow bottom and keeps the plough in a true path behind the tractor.

Assuming that the plough had run shallow momentarily, it would require to get down to its depth again quickly. If the heel 3c of the landside were resting on the bottom of the furrow, as in the case of ordinary wheeled ploughs, the plough could not get into its depth sufficiently quickly. With the movable wheel 10 however, it can get to its normal depth as quickly as need be because it can move downward vertically relative to the wheel 10 because the latter is vertically movable relative to the plough.

I claim:

1. A ground-engaging member for an agricultural implement for use with a tractor comprising, a ground-engaging part, a pivotal arm for attaching same to the implement so as to allow relative vertical movement between said part and the implement but preventing relative lateral movement, and spaced stop members for limiting the said movement said arm being connected to the implement at a point lower than its connection to said part so as to give a line of draft tending to keep said part in engagement with the ground.

2. A ground-engaging member for an agricultural implement for use with a tractor comprising, a ground-engaging part in the wake of the implement, an arm for pivotally attaching said part to the implement so that the part is capable of pivoting about a substantially horizontal axis, but is adapted to take the side thrust of the implement, said arm being pivotally attached to the implement at a point at or below the level of its attachment to said part in order to constitute a line of draft creating a downward pressure on said part and means for urging said wheel downwards with reference to the implement.

3. A ground-engaging member for an agricultural implement comprising a ground-engaging wheel with a convex side, an arm carrying said wheel in an inclined position with the convex side uppermost and having a pivotal attachment to the implement at or below the level of its connection to said wheel so that the wheel can move vertically with reference to the implement but is adapted to take the side thrust thereof, spaced stop means constituting upper and lower limits for said vertical movement and spring means urging said arm downwardly with reference to the implement the spring means and the disposition of the said arm being such that in normal working position the said wheel "floats" with reference to the implement between the positions determined by said stop means.

4. Means for preventing lateral drift of an agricultural implement for use with a tractor comprising, a bracket attachable to the implement, an arm pivotally mounted on said bracket so as to be capable of vertical movement, a ground-engaging wheel with a convex side obliquely carried on said arm so that said side faces upwardly and the lower part of said side laterally engages the furrow wall, a sector shaped projection on said bracket partly enclosing and forming upper and lower stop means for the arm and a leaf spring attached on the arm with its free end engaging said projection.

5. A plough having ground-engaging means comprising, a bracket attachable to the plough, an arm pivotally mounted on said bracket so as to be capable of vertical movement, a ground-engaging wheel with a convex side carried on said arm in an inclined position so that said side faces upwardly and the lower part of said side laterally engages the furrow wall, a sector shaped projection on said bracket partly enclosing and forming upper and lower stop means for the arm and a leaf spring attached on the arm with its free end engaging said projection.

6. A ground-engaging member for an agricultural implement for use with a tractor comprising, a ground-engaging part, a floating connection between said part and the implement so that said part is rigid laterally with reference to the implement but allowing upward or downward relative vertical movement between said part simultaneously as a whole and the implement from the normal operating position of said part and spaced stop members to limit the amplitude of said movement.

7. A ground-engaging member for an agricultural implement for use with a tractor comprising, a ground-engaging part for taking the side thrust of the implement, a floating connection between said part and the implement allowing relative upward or downward movement between said part simultaneously as a whole and the implement and causing a downward pressure on the said part arising from the line of draft between same and the implement and spaced stop members to limit the amplitude of said movement.

8. A plough comprising upper and lower attachment means for connecting it to a tractor so as to be capable of substantially parallel vertical movement with reference to the latter, a landside with its lower edge so arranged that the point of the plough has a vertical lead into the land, a ground-engaging member and means for connecting same to the plough so that with reference to the latter, it has freedom of movement vertically whilst being laterally rigid to take side thrust from the plough.

9. In combination a tractor, an agricultural implement, a hitch connection between the tractor and implement comprising spaced elements allowing lateral swinging of the implement with reference to the tractor, a ground-engaging part and means for connecting same to the implement so that said part is rigid laterally with reference to the implement but is capable of vertical movement relative to the implement.

10. In combination a tractor, an agricultural implement, means for attaching the implement to the tractor comprising spaced connecting members universally attached to the tractor and to the implement, said members permitting free lateral and vertical movement of the implement relative to the tractor when in operation, the members being so spaced that in operation free lateral swinging of the implement is permitted relative to the tractor about centers within a relatively small area located apart from the actual connection between the tractor and implement, a ground-engaging part and means for connecting same to the implement so that said part is rigid laterally with reference to the implement but is capable of vertical movement relative to the implement.

11. In combination a tractor, an agricultural implement, means for attaching the implement to the tractor comprising links universally connected to the implement and the tractor and so spaced that their longitudinal axes when produced meet at a point in front of the actual connections to the tractor, a ground-engaging part and means for connecting same to the implement so that said part is rigid laterally with reference to the implement but is capable of vertical movement relative to the implement.

12. In combination a tractor, an agricultural implement, means for attaching the implement to the tractor comprising links universally connected to the implement and the tractor and so laterally spaced that their connections to the tractor are closer than their connections to the implement, a ground-engaging wheel and means for connecting same to the implement so as to be rigid laterally with reference to the implement but capable of vertical movement relative to the implement.

13. In combination a tractor, an agricultural implement, means for connecting the implement to the tractor comprising two laterally spaced convergent links, universal means for connecting said links to the tractor, a link which is vertically spaced from said first links, and is forwardly convergent with respect thereto, universal means for connecting said link to the tractor and the implement, a ground-engaging member, and means for connecting same to the implement so that with reference to the latter, said member has freedom of movement vertically whilst being laterally rigid to take side thrust from the implement.

14. In combination a tractor, an agricultural implement, means for connecting the implement to the tractor comprising two laterally spaced convergent links, universal means for connecting said links to the tractor, a link which is vertically spaced from said first links and is forwardly convergent with respect thereto, universal means for connecting said link to the tractor and the implement, a ground-engaging part and means for connecting same to the implement so that said part is rigid laterally with reference to the implement but is capable of vertical movement relative to the implement.

15. A ground-engaging member for an agricultural implement for use with a tractor comprising, a ground engaging part, a pivotal arm for attaching same to the implement so as to allow relative vertical movement between said part and the implement but preventing relative lateral movement, said arm being connected to the implement at a point lower than its connection to said part so as to give a line of draft tending to keep said part in engagement with the ground.

16. A ground-engaging member for an agricultural implement for use with a tractor comprising, a ground engaging part, a pivotal arm for attaching same to the implement so as to allow relative vertical movement between said part and the implement but preventing relative lateral movement and stop means for limiting said vertical movement, said arm being connected to the implement at a point lower than its connection to said part so as to give a line of draft tending to keep said part in engagement with the ground.

17. In combination a tractor, an agricultural implement, means for attaching the implement to the tractor comprising spaced connecting members universally attached to the tractor and to the implement, the members being so spaced that in operation free lateral swinging of the implement is permitted relative to the tractor about centers within a relatively small area located apart from the actual connection between the tractor and implement, and a ground-engaging part, a pivotal arm for attaching same to the implement so as to allow relative vertical movement between said part and the implement but preventing relative lateral movement and stop means for limiting said vertical movement, said arm being connected to the implement at a point lower than its connection to said part so as to give a line of draft tending to keep said part in engagement with the ground.

18. In combination, a tractor, an agricultural implement, means for connecting the implement to the tractor comprising vertically spaced link means spaced to cause a line of draft tending to keep the implement in the ground and universal means for connecting said link means to the tractor and implement, and a ground-engaging part, a pivotal arm for attaching same to the implement so as to allow relative vertical movement between said part and the implement but preventing relative lateral movement, and stop means for limiting said vertical movement, said arm being connected to the implement at a point lower than its connection to said part so as to give a line of draft tending to keep said part in engagement with the ground.

19. In combination, a tractor, an agricultural implement means for connecting the implement to the tractor, said means being vertically spaced to cause a line of draft other than from the actual point of connection, and laterally spaced so that free lateral swinging of the implement with reference to the tractor is permitted about centers within a relatively small area located apart from the actual connection between the tractor and the implement and a ground-engaging part, a pivotal arm for attaching same to the implement so as to allow relative vertical movement between said part and the implement but preventing relative lateral movement and stop means for limiting said vertical movement, said arm being connected to the implement at a point lower than its connection to said part so as to give a line of draft tending to keep said part in engagement with the ground.

20. In combination a tractor, an agricultural implement, means for hitching the implement to the tractor comprising upper and lower link elements universally connected to the tractor and implement and allowing relative vertical movement therebetween and so spaced that the effective line of draft tends to keep the implement in the ground, a movable member on the tractor connected to a link element and adapted to receive through same a force in proportion to the draft on the implement and be moved in accordance with said force to cause raising or lowering of the implement in accordance with the draft pressure thereon, and a ground-engaging part, a pivotal arm for attaching same to the implement so as to allow relative vertical movement between said part and the implement but preventing relative lateral movement and stop means for limiting said vertical movement, said arm being connected to the implement at a point lower than its connection to said part so as to give a line of draft tending to keep said part in engagement with the ground.

HENRY GEORGE FERGUSON.